(12) United States Patent
Tilk et al.

(10) Patent No.: US 12,530,572 B2
(45) Date of Patent: Jan. 20, 2026

(54) METHOD FOR CONFIGURING A NEURAL NETWORK MODEL

(71) Applicant: Continental Automotive GmbH, Hannover (DE)

(72) Inventors: Bence Tilk, Oslo (NO); Csaba Nemes, Dunakeszi (HU)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 1040 days.

(21) Appl. No.: 17/204,188

(22) Filed: Mar. 17, 2021

(65) Prior Publication Data

US 2021/0303999 A1 Sep. 30, 2021

(30) Foreign Application Priority Data

Mar. 24, 2020 (EP) ..................................... 20165187

(51) Int. Cl.
*G06F 18/241* (2023.01)
*G06F 18/21* (2023.01)
(Continued)

(52) U.S. Cl.
CPC ........... *G06N 3/08* (2013.01); *G06F 18/2155* (2023.01); *G06F 18/2163* (2023.01); *G06F 18/241* (2023.01)

(58) Field of Classification Search
CPC ... G06N 3/08; G06F 18/2163; G06F 18/2155; G06F 18/241
See application file for complete search history.

(56) References Cited

FOREIGN PATENT DOCUMENTS

CN 108197670 A 6/2018
CN 108399431 A 8/2018

OTHER PUBLICATIONS

Li, J., et al, Transfer Independently Together: A Generalized Framework for Domain Adaptation, [received Oct. 31, 2024]. Retrieved from Internet :<https://ieeexplore.ieee.org/abstract/document/8337102?casa_token=_Ri4ys-elukAAAAA:mCYcLMKKNBjmOqA6BNDW_HiZYdcC6sISy3HzvDzXglke_8RtFit5HzCQDn3RuVG-KBmHhhhX> (Year: 2019).*

(Continued)

*Primary Examiner* — Miranda M Huang
*Assistant Examiner* — Bart I Rylander
(74) *Attorney, Agent, or Firm* — Buchanan Ingersoll & Rooney PC (57) ABSTRACT

The invention relates to a computer-implemented method (100) for configuring a neural network model, wherein the method comprises the following steps: providing (102) a neural network model; splitting (104) the neural network model into a first portion and a second portion, the second portion comprising a first head for classifying a first type of classification data and a second head for classifying the second type of classification data; pre-processing (106), in a training phase, the second type of classification data in the first portion, processing (108) the pre-processed second type of classification data in the first and second heads and determining a first result of the processing of first type of classification data in the first head and a second result of the processing of first type of classification data in the second head; calculating (110) the consistency between the first result and the second result; and configuring (112) the neural network model by updating a value of at least one parameter of the second head based on the calculated consistency.

17 Claims, 4 Drawing Sheets

(51) Int. Cl.
   *G06F 18/214*   (2023.01)
   *G06N 3/08*   (2023.01)

(56) References Cited

OTHER PUBLICATIONS

Han, Y., et al, Deep learning with domain adaptation for accelerated projection-reconstruction MR, [received Jun. 14, 2024]. Retrieved from internet :<https://onlinelibrary.wiley.com/doi/full/10.1002/mrm.27106> (Year: 2018).*
Liu, M., et al, Unsupervised Image-to-Image Translation Networks. Retrieved from Internet :<https://proceedings.neurips.cc/paper_files/paper/2017/hash/dc6a6489640ca02b0d42dabeb8e46bb7-Abstract.html> (Year: 2017).*
Long, M., et al, Learning Transferable Features with Deep Adaptation Networks. Retrieved from Internet :<https://proceedings.mlr.press/v37/long15> (Year: 2015).*
Pereira, L., et al, Semi-supervised transfer subspace for domain adaptation. Retrieved from Internet :<https://www.sciencedirect.com/science/article/pii/S0031320317301632> (Year: 2018).*
Shu, R., et al, A DIRT-T Approach to Unsupervised Domain Adaptation. Retrieved from Internet: <https://arxiv.org/abs/1802.08735> (Year: 2018).*
Song, Y., et al, Improving Unsupervised Domain Adaptation with Variational Information Bottleneck. Retrieved from Internet :<https://arxiv.org/abs/1911.09310> (Year: 2019).*
Zhang, Y., et al, Unsupervised Multi-Class Domain Adaptation: Theory, Algorithms, and Practice. Retrieved from Internet :<https://ieeexplore.ieee.org/abstract/document/9253700> (Year: 2020).*
Zhu, K., et al, A survey of generative adversarial networks. Retrieved from Internet :<https://ieeexplore.ieee.org/abstract/document/8623645> (Year: 2018).*
Li, J., et al, Transfer Independently Together: A Generalized Framework for Domain Adaptation. Retrieved from Internet :<https://ieeexplore.ieee.org/abstract/document/8337102?casa_token=_Ri4yselukAAAAA:mCYcLMKKNBjmOqA6BNDW_HiZYdcC6sISy3HzvDzXglke_8RtFit5HzCQDn3RuVG-KBmHhhhX> (Year: 2019).*
Roy, S., et al, Unsupervised Domain Adaptation using Feature-Whitening and Consensus Loss, [received Feb. 7, 2025]. Retrieved from Internet: <https://openaccess.thecvf.com/content_CVPR_2019/html/Roy_Unsupervised_Domain_Adaptation_Using_Feature-Whitening_and_Consensus_Loss_CVPR_2019_paper.html> (Year: 2019).*
Ren, L., et al, Environment Influences on Uncertainty of Object Detection for Automated Driving Systems. Retrieved from Internet :< ieeexplore.ieee.org/abstract/document/8965948?casa_token=Z7k9fhVSVAYAAAAA:LTwsKs3Gjoa5Q12JyoT95LU6Wwwv9rg4pR7HT69OLzd8HcE3YWZCKG6L7MtDKodJsWT8Ty (Year: 2019).*
Ben-David, S., et al, A theory of learning from different domains. Retrieved from Internet: <https://link.springer.com/article/10.1007/s10994-009-5152-4> (Year: 2010).*
Extended European Search Report and Examination Report for European Patent Application No. 20165187.4, dated Oct. 23, 2020, 9 pages, European Patent Office, Munich, Germany.
Yabin Zhang et al., "Unsupervised Multi-Class Domain Adaptation: Theory, Algorithms, and Practice", Journal of Latex Class Files, vol. 14, No. 8, arXiv:2002.08681v1, Feb. 20, 2020, XP081604178, pp. 1 to 27.
Safa Cicek et al., "Unsupervised Domain Adaptation via Regularized Conditional Alignment", 2019 IEEE/CVF International Conference on Computer Vision (ICCV), Oct. 27, 2019, XP033723361, pp. 1416 to 1425.
Toshihiko Matsuura et al., "TWINs: Two Weighted Inconsistency-reduced Networks for Partial Domain Adaptation", arXiv:1812.07405v1, Dec. 18, 2018, XP080994261, pp. 1 to 11.
Antti Tarvainen et al., "Mean Teachers are Better Role Models: Weight-Averaged Consistency Targets Improve Semi-Supervised Deep Learning Results", arXiv:1703.01780v6, Apr. 16, 2018, pp. 1 to 16.
Kuniaki Saito et al., "Semi-Supervised Domain Adaptation via Minimax Entropy", arXiv:1904.06487v2, Apr. 16, 2019, pp. 1 to 12.
Saito et al., "Maximum Classifier Discrepancy for Unsupervised Domain Adaptation", 2018 IEEE/CVF Conference on Computer Vision and Pattern Recognition, IEEE, (Jun. 18, 2018), pp. 3723-3732.
Office Action (Communication pursuant to Article 94(3) EPC) issued May 13, 2024, by the European Patent Office in corresponding European Patent Application No. 20 165 187.4-1203. (9 pages).
Office Action (The First Office Action) issued Apr. 22, 2024, by the State Intellectual Property Office of People's Republic of China in corresponding Chinese Patent Application No. 202110308883.2 and an English translation of the Office Action. (18 pages).
Office Action (Communication pursuant to Article 94(3) EPC) issued Jul. 4, 2025, by the European Patent Office in corresponding European Patent Application No. 20 165 187.4-1207. (3 pages).

* cited by examiner

Fig. 5

METHOD FOR CONFIGURING A NEURAL NETWORK MODEL

TECHNICAL FIELD

The invention relates to a computer-implemented method for configuring a neural network model, a neural network, a use of the neural network for configuring a neural network model, a computer program element, and a computer-readable medium.

BACKGROUND

Domain adaptation is a field of machine learning, which aims to exploit the knowledge of a given domain, called source domain, and wherein the knowledge is transferred to another domain, called target domain. This is a special case of the so-called transfer learning, where the given task is the same for both domains, but the target dataset may contain distribution shift compared to the source dataset. An example of this problem is object detection daytime and night-time images e.g. of an environment of a vehicle.

The usual approach of learning in the source and target domain is to try to modify the inner representation of the data, such that they are as similar as possible for both domains. Using this approach has the effect that target and source labels are mixed equally. This approach is also known as naive mixing. Naive mixing of target and source labels is, however, problematic because during training it does not indicate to the network that the target is more important than the source. Whenever, e.g., due to some limitations, the network must choose which label patterns it should memorize, it will not be able to prioritize the target label patterns. In corner cases, when more source labels are available this can seriously affect the accuracy on target.

SUMMARY

There may, therefore, be a need to improve the accuracy in transfer learning. The problem is solved by the subject-matter of the independent claims. Embodiments are provided by the dependent claims, the following description and the accompanying figures.

The described embodiments similarly pertain to the method for configuring an neural network model, the system for configuring a neural network model, the computer program element and the computer-readable medium. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a computer-implemented method for classifying a second type of classification data in a neural network is provided. The method comprises the following steps. In a first step, a neural network model is provided. The neural network model is split into a first portion and a second portion, the second portion comprising a first head for classifying a first type of classification data and a second head for classifying the second type of classification data. In a training phase, the first type of classification data is pre-processed in the first portion. The such pre-processed second type of classification data is then processed in the first and second heads, and a first result of the processing of second type of classification data in the first head is determined and a second result of the processing of second type of classification data is determined in the second head.

In a further step, the consistency between the first result and the second result is calculated, and the neural network model is configured by updating a value of at least one parameter of the second head and at least one parameter of the first head based on the calculated consistency.

The method aims at classifying a second type of classification data using knowledge of the neuronal network with respect to classifying a first type of classification data. In this disclosure, the invention is explained with a neural network, however, any artificial intelligence module may be used, which can be split into a first portion and a second portion. Therefore, the term "neural network" stands for any such a module for artificial intelligence.

The expressions "classify" or "classification" is to be interpreted in a broad sense in this disclosure. They include, e.g., object detection, semantic segmentation, audio identification, key point detection and further applications of machine learning. Consequently, "classification data" comprises the underlying input data for the classification process and represent the data to be classified in terms of the above interpretation.

The neural network model may be a convolutional neural network, a recurrent neuronal network, or any other neuronal network. The neuronal network comprises several layers, starting from an input layer over so-called hidden layers to an output layer. The classification data has to pass each of these layers, depending on the network type also more than once, where it is transformed and finally categorized. The layers are, according to the method, separated into a first portion, i.e., a first number of layers, and into a second portion, i.e., a second number of layers. The data is pre-processed in the first portion, which means, that it is running through the first layers and output to the second portion, where the further and final processing is performed.

The second portion has two separate, parallel branches, which are called first head and second head in this disclosure. Depending on the type, i.e. first type or second type, of classification data, either the first or the second header is responsible for classifying the classification data. In a training phase, however, the first type of classification data is entered in a usual way to the first portion, where it is pre-processed and subsequently entered in both, the first head and the second head, where it is processed. The result of the processing in one of the heads indicates, e.g., a category, to which the head would have classified the classification data. The results from the two heads are compared using a mathematical, e.g. statistical, function, and the settings or configuration, respectively of the second head are updated based on the comparison. More sophistically, the consistency between the first head and the second head is calculated, and one or more values of the internal parameters of the second head and the first head, respectively, are modified based on the calculated consistency. The results provided by the two heads may differ, because, for example, one of the heads may have been trained yet before, or because the training data may differ. Preferably, each of the parameters in the network model is updated.

According to an embodiment, the artificial intelligence module is embodied as a neural network, particularly as a convolutional neural network.

According to an embodiment, the first portion may comprise encoder layers, i.e., the feature extraction layers of the neuronal network, and the second layer may comprise the classification layers of the neuronal network. Moreover, the encoder layers may comprise the input layer of the neuronal network, and the classification layers may comprise the output layers of the neuronal network.

According to an embodiment, the first type of classification data is correlated with the second type of classification data. That is, the data of the first type are similar to the data of the second type. As an example, the images show the same scene, but the first image dataset is recorded at day time and the second image dataset is recorded at night time. This feature represents the basis for the knowledge transfer from the first domain to the second domain, so that the inner representation of the heads converge during the training.

According to an embodiment, the neural network model provides domain adaptation, and the first type of classification data is source data and the second type of classification data is target data. Thus, the domains are adapted to each other during the training, and second head data, also denominated as target labels in this disclosure, are prioritized over the first head data, which is also denominated as source labels in this disclosure, depending on the consistency.

According to an embodiment, previous to the step of pre-processing the second type of classification data in the first portion, a training of the first portion and training of the first head is performed.

For example, the first head may have been trained with the first type of classification data in a further training phase previous to the present training phase. Further, also during the present training phase, there is labelled data, which is used in a classical way to update the configuration of the corresponding head. Since at least some of the characteristics of the first and second data and the amount of datasets differ from each other, also the configuration, e.g., the internal weights of the heads will differ, leading to an inconsistency between the two heads for a given dataset, such as an image or a plurality of images of an iteration.

If, e.g., the consistency is good, the influence on the determination of the update values for the second head may be based nearly equal for the values of the first and the second head. However, the consistency may be low, for example, because there are far more labelled source data, so that the source data weights dominate, and the influence on the determination of the update values for the second head would be based mainly on the first head. To avoid this, the second, i.e., the target labels are prioritized by the proposed method, for example, by mixing the calculated update values, e.g., weight vectors, of the two heads with a relation corresponding to the calculated consistence.

In an example, the parameter values are updated in such a way, that the consistency loss is determined, e.g., by functions as described further below, a standard loss of the output of, e.g., the second head is calculated by comparing correct classifications with false classifications, and subsequently, a weighted average of these two losses is calculated. This calculation and update may be done in one step, e.g., for each dataset or iteration.

According to an embodiment, a first head standard loss is calculated for the first head, and the step updating parameter values of the second head based on the calculated consistency is only performed if the first head standard loss is lower than a pre-defined threshold, such that the first head has a substantiated basis in order to provide knowledge transfer to the second head, with the standard loss as a measure. This means that advantageously, a sufficient knowledge base of the source is present before starting a knowledge transfer from the source to the target. The measure for having a sufficient knowledge base is the standard loss according to this embodiment.

According to another example, a first head accuracy is calculated for the first head, and the step configuring the neural network model by updating a value of at least one parameter of the second head and at least one parameter of the first head based on the calculated consistency is only performed if the first head accuracy is greater than a pre-defined threshold, such that the first head has a substantiated basis in order to provide knowledge transfer to the second head, with the accuracy a measure. Of course, also standard loss and/or accuracy may serve as a measure. Further conditions may be introduced, as for example, the condition that standard loss and/or accuracy have to fulfil the threshold condition for a number of epochs.

According to an embodiment, the parameter values to be updated in the first and/or second head are weights of the neural network, i.e., the internal weights which characterize the layers.

According to an embodiment, the second type of classification data is partly labelled and partly unlabelled, which represents the so-called semi-supervised case. The labelled first type of classification data or, for short, source data, is used to train the first head in a usual way. The labelled second type of classification data or, for short, target data, is used to train the second head in the way presented above. Unlabelled data may be classified based on, e.g., the gained initial knowledge of the labelled source and target data and in the course of the learning also on the unlabelled target data. Also, unsupervised learning is possible, where no labelled target data is available. The learning with respect to the target data starts with the initial knowledge of the labelled source data, and proceeds with the knowledge gained gradually by the estimated classification of the unlabelled target data.

According to an embodiment, the output of the first and the second head is categorical, and the calculation of the consistency takes place on the basis of the Jensen-Shannon divergence, which is a method of measuring the similarity between two probability distributions. A softmax or a sigmoid function is used for the categorical output.

According to an embodiment, the output of the first and the second head is continuous, and the calculation of the consistency is carried out on the basis of the mean square error.

According to an aspect, a neural network with a configuration achieved with a method as described above is provided.

According to a further aspect, a use of the neural network for detecting or classifying objects or features in images of an ADAS or AD camera system is provided. The detected or classified objects or features may be used in order to control functions of and ADAS (advanced driver assistance system) or a system for automated driving (AD) like e.g. a lane keeping system, an adaptive cruise control system, an autonomous emergency braking system, a construction site assistant, a traffic jam assistant, a highway chauffeur or an autopilot function for a vehicle. A use of the neural network for classifying target patterns, detecting a lane, an object, or a key point, for semantic segmentation, or for classifying text e.g. on traffic signs, or to estimate a pose e.g. of a pedestrian is provided. However, the use of the computer-implemented method is not limited to these applications and may further include detection or classification of acoustic patterns or semantic objects.

The given method can be easily used for any machine learning method, where two data sources are given. The method is the most useful in situations, where the target dataset is not big enough to reach the desired performance, but a large enough similar dataset is given. Areas, where the method can be advantageous, are classification, object detection, semantic segmentation, audio identification, and key point detection.

In an example, a data processing system, e.g., a computer, comprising means for carrying out the steps of the method is provided. The data processing system may comprise circuits without programmable logics or may be or comprise a micro controller, a field programmable gate array (FPGA), an ASIC, a Complex Programmable Logic Devices (CPLD), or any other programmable logic devices known to person skilled in the art.

According to a further aspect, a computer program element is provided that comprises instructions which, when the program is executed by a computer, cause the computer to carry out the steps of the method. The computer program element may be part of a computer program, but it can also be an entire program by itself. For example the computer program element may be used to update an already existing computer program to get to the present invention.

According to a further aspect, a computer-readable medium is provided, that comprises instructions which, when executed by a computer, cause the computer to carry out the steps of the method. The computer readable medium may be seen as a storage medium, such as for example, a USB stick, a CD, a DVD, a data storage device, a hard disk, or any other medium on which a program element as described above can be stored.

These and other aspects of the present invention will become apparent from and elucidated with reference to the embodiments described hereinafter.

BRIEF DESCRIPTION OF DRAWINGS

Exemplary embodiments of the invention will be described in the following with reference to the following drawings.

The figures are merely schematic representations and serve only to illustrate embodiments of the invention. Identical or equivalent elements are in principle provided with the same reference signs.

DESCRIPTION OF EMBODIMENTS

Figure 1:
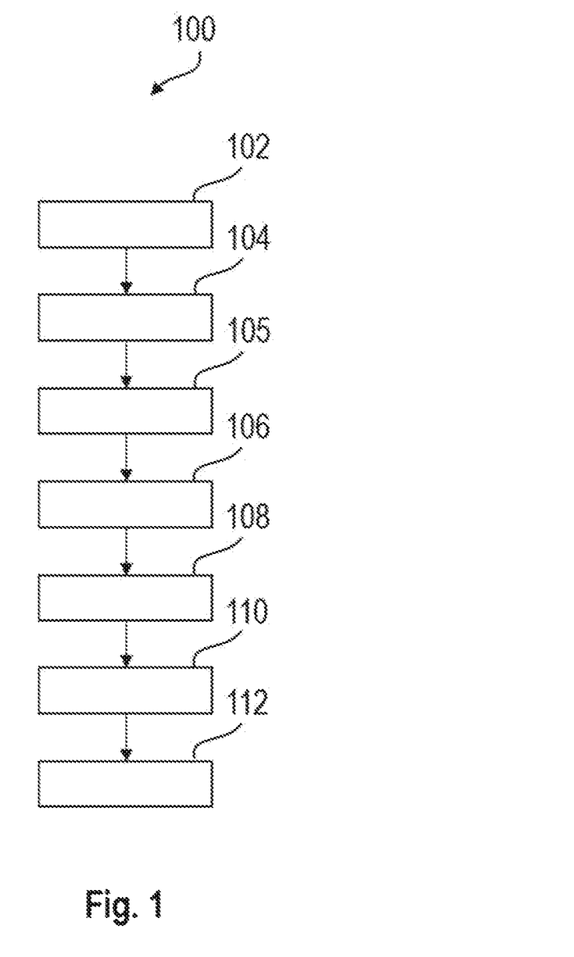
FIG. 1 shows a flow diagram of the computer-implemented method for classifying target patterns in a neural network according to an embodiment.

FIG. 1 shows a flow diagram of the computer-implemented method (100) for classifying target patterns or target data, respectively, in a neural network, in which the neural network is trained with patterns which have target patterns in part and source patterns, or source data, respectively, in part. The method comprises the following steps: In step 102, a neural network model is provided. In step 104, the neural network model is split into a first portion and a second portion, the second portion comprising a first head for classifying a first type of classification data and a second head for classifying the second type of classification data. Optionally, in step 105, first the target head is trained up to a certain degree. In step 106, in a training phase, the second type of classification data in the first portion is pre-processed. In step 108, the pre-processed second type of classification data is processed in the first and second heads and a first result of the processing of first type of classification data in the first head and a second result of the processing of first type of classification data in the second head is output. In step 110 the consistency between the first result and the second result is calculated. In step 112, the neural network model is configured by updating a value of at least one parameter of the second head and at least one parameter of the first head based on the calculated consistency.

Figure 2:
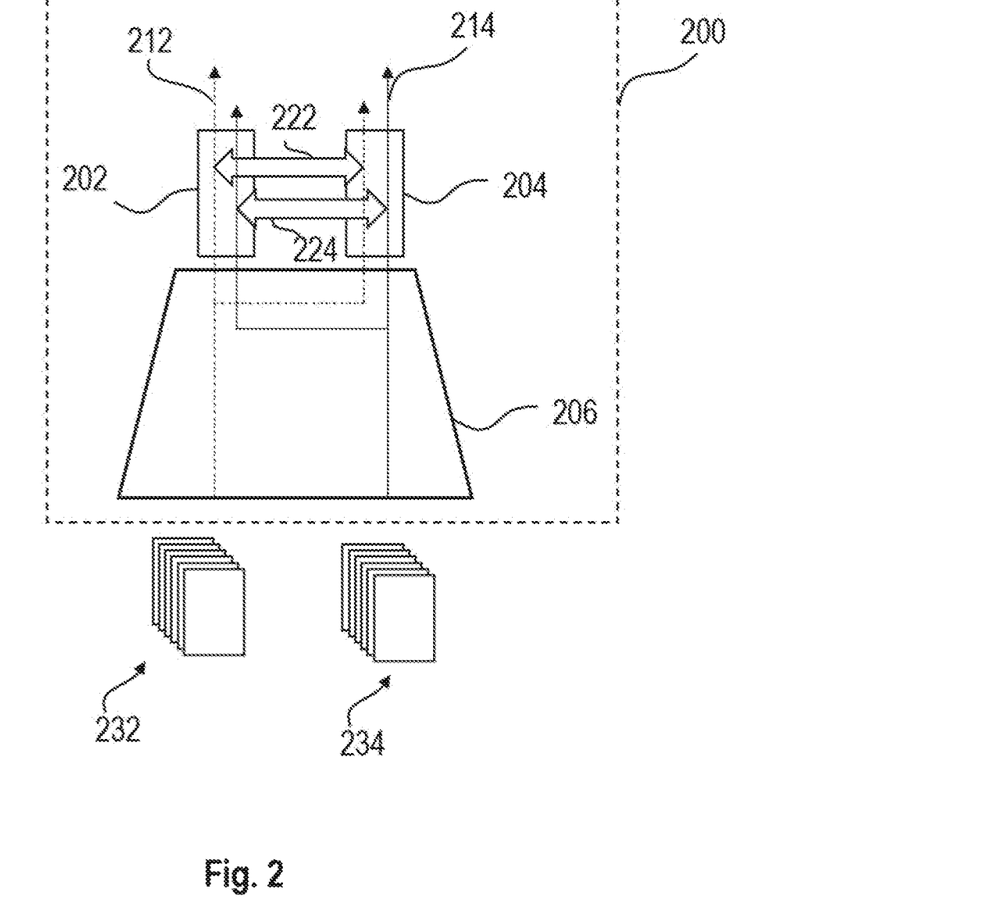
FIG. 2 shows a block diagram of the neural network for classifying target patterns in a neural network according to an embodiment.

The proposed algorithm's architecture is explained with FIG. 2. The predefined neural network model implemented in a data processing system is decomposed to encoder 206 and head 202, 204. The encoder 206 comprises the layers of the neural network and performs the feature detection. Then, two head instances 202, 204 are created, so that a first head 202 for the source data 232, and a second head 204 for the target data 234 is obtained. The head instances 202, 204 perform the classification taking the results of the encoder 206 as input, and providing the classification as output. In the next step, if labels are available for the given data point, training is performed using a usual training process. The source data 232 is routed through the encoder 206, and is passed to the first head 202. The target data 234 is also routed through the encoder 206, however, then it is passed to the second head 204. In both headers, the same loss function is used to calculate the losses 212 and 214, respectively. In the following step, for calculating the consistency between the two, source data 232 is passed through the first 202 and second 204 head, and the consistency value between the outputs of the two heads is calculated, as indicated by arrows 224 and 222. Similarly, target data is passed through the first 202 and second 204 head, and the consistency value between the outputs of the two heads is calculated. I.e., both, the usual process and the consistency calculation provide updates and a weighted average of these two updates is applied on the model's parameters. As consistency function, for example the following functions may be used. Depending on the prediction type, if the output is defined as categorical output, i.e., the last activation is softmax or sigmoid, then the Jensen-Shannon divergence is used. If the output is defined as continuous output, i.e., the last activation is linear, then a mean squared error function is used.

Figure 3:
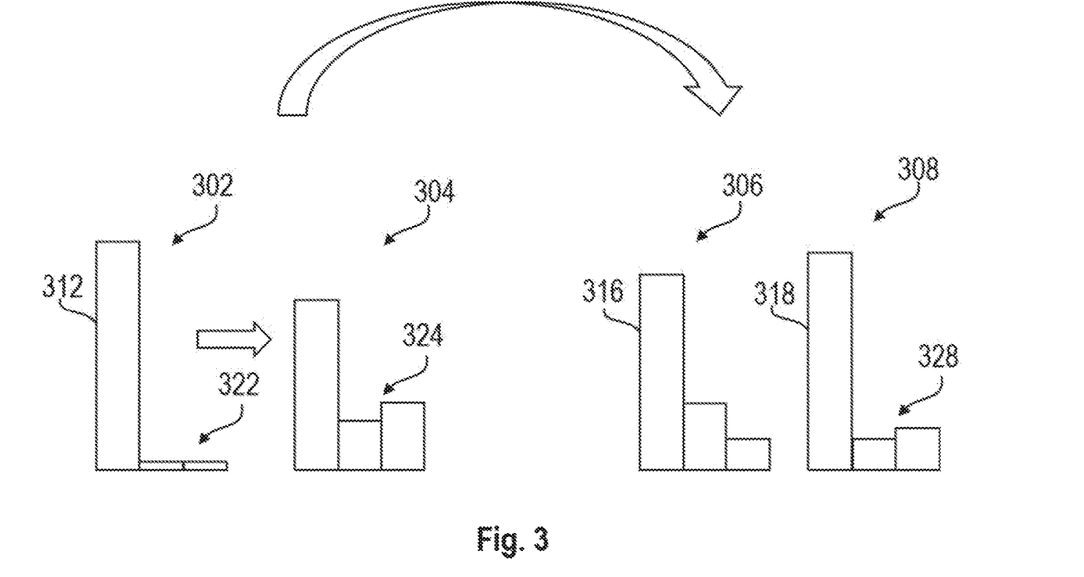
FIG. 3 shows first diagrams of classification probabilities before adaptation according to an embodiment.
Figure 4:
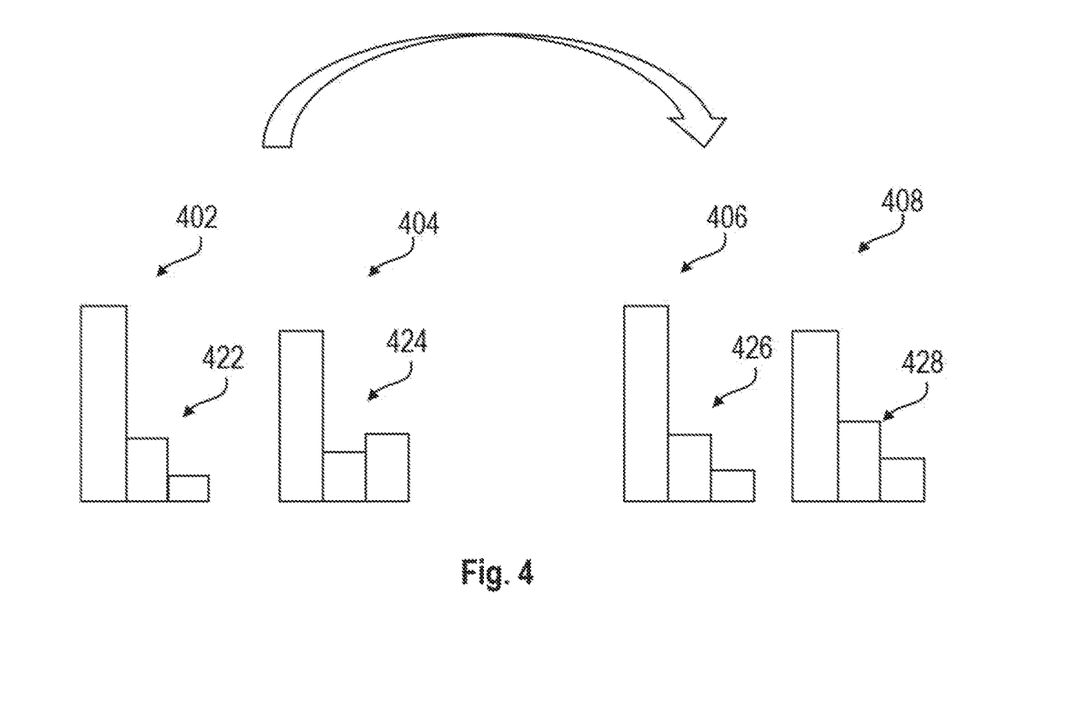
FIG. 4 shows second diagrams of classification probabilities after adaptation according to an embodiment.

In FIG. 3, four diagrams of classification probabilities before adaptation are depicted. Diagram 302 shows classification probabilities of a target label for the three most probable classes. Since it is a label, the probability for the correct label "classification" 312 is one, and the probability for other classifications 322 zero. Diagram 304 shows the probabilities for the same classes at the output of the neuronal network. It can be seen that the wrong classification probabilities 324 are relatively high. Diagrams 306 and 308 show the prediction of the first, i.e. source head 306, and the second, i.e., target head 308. It can be noticed that first, the correct target prediction 318 in 308 has a higher probability than in the prediction 302 (312), and the probabilities 328 for the further classes for this target label are relatively low. Second, the probability of the correct target prediction 318 is higher than the probability of the correct source prediction 316. This difference represents a consistency loss, which is taken into account for the next updates of the weights in the second head. The effect of these updates is shown in FIG. 4, where it can be seen that the source prediction 402, 406 and the target prediction 404, 408 converge such that even the ordering of the second and third probabilities 422, 423 get the same as shown by the probabilities 426 and 428 of the source prediction 406 and the target prediction 426, respectively.

Figure 5:
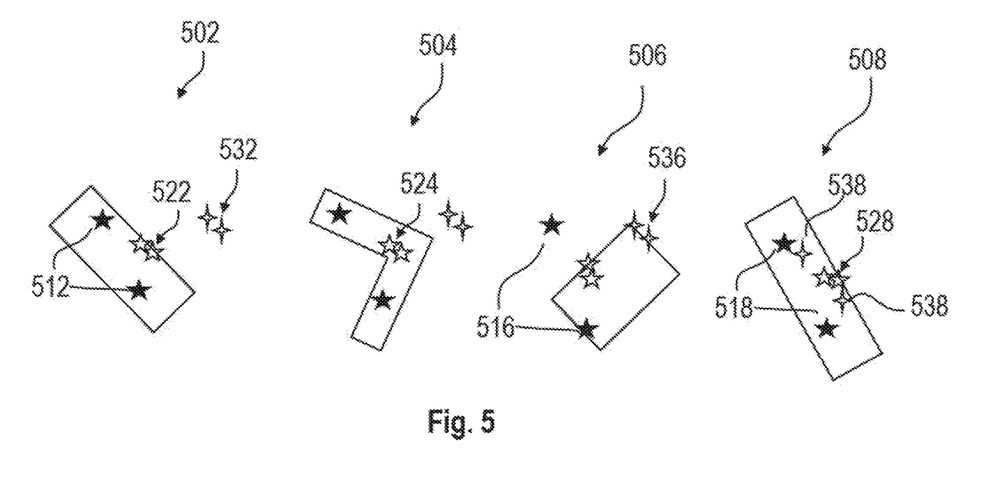
FIG. 5 shows an illustration of the effect of the method according to an embodiment compared to other methods.

FIG. 5 depicts an illustration of the effect of the method at hand of a simple classification example to explain the main differences between the proposed and other relevant methods.

In the example it is assumed that the neuronal network can only fit two shapes: a rectangle shape and an "L" shape. Further, it is assumed that the network is working on a vectoral presentation of the input data, which can be depicted in a simple 2-dimensional space. The task is to classify all the stars, i.e., to cover only the stars. The difficulty is to find the stars in the target validation set as well. This is called the generalization capability of the model.

When the model is only trained on labelled target 502, it fits for only the seen target samples 512. Both available shapes can cover the target labelled stars 512. From the perspective of the training the two shapes are equally good. Usually, the network will select the simplest pattern which does the job. However, the target validation stars 522 are missed.

In the proposed method 100, 504 (domain consistency) the two shapes are not equally good, as it sees the examples from the source domain. Consistency loss will break the tie between the shapes, and the L shape will be selected. All of the validation stars 524 are covered.

Naive mixing 506 can incorporate information about labelled target data 516 as well as labelled source data 536. However, in this case, source 536 and target 516 data are seen to be equally important. Source data 536 is considered as part of the target data 516. Therefore, the available shapes cannot cover all 4 stars 516, 536. The network will randomly select three stars, which can be covered by the network.

In the example of 508, unlabelled data is used to modify the representation space so that source and target representations get close to each other. In our example, this is illustrated as a transformation of the representation space so that the target 518 and validation 528 stars get close to each other. In a lucky case, the transformation also puts the validation stars 528 closer to the target stars 518 resulting in an easier classification problem, which can be covered by a simple rectangle. However, this is not always the case, as illustrated in our example: one of the validation stars 528 gets onto the border of the selected shape.

Usual methods require vast amount of investigation, which inner representation of the neural network should be selected for the embedding space. The usual methods all use naive mixing (or nothing) when dealing with unlabelled part of the target.

In semi-supervised domain adaptation, where a limited amount of target domain data is labelled, all baseline methods can be improved if the proposed solution is used instead of naive mixing. The proposed solution has a superior performance in comparison with usual supervised domain methods.

In an example, the method is used to improve the camera product. In the camera production the number of available images is around 15000, which is not enough to reach the predefined key performance indicators. The method is used to improve the generalization capabilities with public datasets and datasets, which are collected with a different camera sensor. This approach of creating a product can result in months of advantage, as it is possible to work on the problem before a sufficient amount of data is created.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfil the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A computer-implemented method for configuring neural network model, wherein the method comprises:
  providing the neural network model;
  splitting the neural network model into a first portion and a second portion, the second portion comprising a first head, configured to classify a first type of classification data and a second head, configured to classify the second type of classification data, wherein the second type of classification data is a target data;
  pre-processing, in a training phase, the second type of classification data in the first portion,
  processing the pre-processed second type of classification data in the first and second heads and determining a first result of the processing of second type of classification data in the first head and a second result of the processing of second type of classification data in the second head;
  calculating a consistency between the first result and the second result, both the first result and the second result relating to the target data;
  calculating a first head accuracy for the first head;
  only configuring the neural network model by updating a value of at least one parameter of the second head and at least one parameter of the first head based on the calculated consistency when the first head accuracy is greater than a pre-defined threshold, such that the first head has a substantiated basis in order to provide knowledge transfer to the second head; and
  training the neural network model for detecting or classifying objects or features in images of an environment of a vehicle in an advanced driver assistance system (ADAS) or an automated driving (AD) camera system,
  wherein at least portions of the first type of classification data and the second type of classification data are labeled, and wherein labels of the second type of classification data denominated as target labels are prioritized over labels of the first type of classification data denominated as source labels by mixing the updated values of the at least one parameter of the second head and the at least one parameter of the first head with a relation corresponding to the calculated consistency, to indicate that patterns of the target labels are more important than patterns of the source labels.

2. The computer-implemented method according to claim 1, wherein the artificial intelligence module is embodied as a neural network.

3. The computer-implemented method according to claim 1, wherein the first portion comprises encoder layers, and the second portion comprises classification layers.

4. The computer-implemented method according to claim 1, wherein the first type of classification data is correlated with the second type of classification data.

5. The computer-implemented method according to claim 4, wherein the images show the same scene, but a first image dataset is recorded at a day time and a second image dataset is recorded at a night time.

6. The computer-implemented method according to claim 1, wherein the neural network model provides domain adaptation, and the first type of classification data is source data.

7. The computer-implemented method according to claim 1, wherein, previous to the step of pre-processing the second type of classification data in the first portion, a training of the first portion and training of the first head is performed.

8. The computer-implemented method according to claim 1, wherein a first head standard loss is calculated for the first head, and the step configuring the neural network model by updating a value of at least one parameter of the second head and at least one parameter of the first head based on the calculated consistency is only performed if the first head standard loss is lower than a pre-defined threshold.

9. The computer-implemented method according to claim 1, wherein the parameter values to be updated in the first and/or second head are weights of the neural network.

10. The computer-implemented method according to claim 1, wherein the second type of classification data is partly labelled and partly unlabelled.

11. The computer-implemented method according to claim 1, wherein the output of the first and the second head is categorical, and the calculation of the consistency takes place on the basis of the Jensen-Shannon divergence.

12. The computer-implemented method according to claim 2, wherein the output of the first and the second head is continuous, and the calculation of the consistency is carried out on the basis of a mean square error.

13. A neural network stored on a non-transitory computer readable medium, the neural network having a configuration achieved with the computer-implemented method according to claim 1.

14. Use of the neural network according to claim 13 for detecting a lane, an object, or a key point, for semantic segmentation, for classifying text, an acoustic pattern, or an object, or to estimate a pose.

15. A computer program element stored on a non-transitory computer readable medium, the program element comprising instructions which, when the program element is executed by a computer, cause the computer to carry out the steps of the method according to claim 1.

16. A non-transitory computer-readable medium comprising instructions which, when executed by a computer, cause the computer to carry out the steps of the method according to claim 1.

17. The computer-implemented method according to claim 1, wherein the artificial intelligence module is embodied as a convolutional neural network.

* * * * *